(12) United States Patent
Patel et al.

(10) Patent No.: US 6,631,299 B1
(45) Date of Patent: Oct. 7, 2003

(54) SYSTEM AND METHOD FOR SELF-TUNING FEEDBACK CONTROL OF A SYSTEM

(75) Inventors: Nital S. Patel, Plano, TX (US); Steven T. Jenkins, Plano, TX (US); Clifton E. Brooks, Plano, TX (US); Stephanie L. Hilbun, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/464,658

(22) Filed: Dec. 15, 1999

Related U.S. Application Data

(60) Provisional application No. 60/131,723, filed on Apr. 30, 1999, and provisional application No. 60/113,425, filed on Dec. 22, 1998.

(51) Int. Cl.$^7$ ............................................. G05B 13/02
(52) U.S. Cl. ........................................................ 700/37
(58) Field of Search ................................ 700/37, 32, 28, 700/121

(56) References Cited

U.S. PATENT DOCUMENTS

| | | | | |
|---|---|---|---|---|
| RE33,267 E | * | 7/1990 | Kraus ........................... | 318/561 |
| 5,283,729 A | | 2/1994 | Lloyd ........................... | 700/37 |
| 5,319,539 A | * | 6/1994 | Shinskey ....................... | 700/37 |
| 5,347,447 A | * | 9/1994 | Kiji et al. ..................... | 318/561 |
| 5,355,305 A | * | 10/1994 | Seem et al. .................... | 700/31 |
| 5,406,474 A | | 4/1995 | Hansen ......................... | 700/37 |
| 5,453,925 A | * | 9/1995 | Wojsznis et al. ............. | 318/561 |
| 5,483,448 A | * | 1/1996 | Liubakka et al. .............. | 700/37 |
| 5,535,117 A | * | 7/1996 | Hiroi ........................... | 700/37 |
| 5,587,899 A | * | 12/1996 | Ho et al. ....................... | 700/37 |
| 5,687,077 A | | 11/1997 | Gough .......................... | 700/29 |
| 5,691,896 A | | 11/1997 | Zou et al. ..................... | 700/37 |
| 5,726,879 A | * | 3/1998 | Sato ............................ | 318/561 |
| 5,768,121 A | | 6/1998 | Federspiel .................... | 700/28 |
| 5,828,573 A | * | 10/1998 | Hayashi ....................... | 700/121 |
| 5,847,952 A | * | 12/1998 | Samad ......................... | 700/37 |
| 6,128,586 A | * | 10/2000 | Pfeiffer ........................ | 700/31 |

OTHER PUBLICATIONS

Yin, et al., Lectures in Applied Mathematics, vol. 33, "Mathematics of Stochastic Manufacturing System." © 1997 *American Mathematical Society*.

Ingolfsson, et al., "Stability and Sensitivity of an EWMA Controller" vol. 25, No. 4, Oct. 1993, *Journal of Quality Technology*.

Adivikolanu, et al., "Run–to–Run Control in Semiconductor Manufacturing: A Literature Survey," Institute for System Research, Univ. of Maryland.

Smith, et al., "Optimal EWMA Run by Run Control of Linear Drifting Processes Buried in White Noise," MIT Microsysems Technology Laboratories, Cambridge, MA.

* cited by examiner

*Primary Examiner*—John Follansbee
*Assistant Examiner*—Edward F. Gain, Jr.
(74) *Attorney, Agent, or Firm*—Jacqueline J. Garner; Wade James Brady, III; Frederick J. Telecky, Jr.

(57) ABSTRACT

A tuned run-to-run controlled system is disclosed that provides tuned run-to-run control of a system. The system includes a controlled system coupled to a tuned run-to-run controller, which contains a feedback controller coupled to a tuner. Tuned run-to-run controller determines a feedback command based on a nominal gain, a maximum gain, a process error, and a tuning gain.

20 Claims, 6 Drawing Sheets

SYSTEM AND METHOD FOR SELF-TUNING FEEDBACK CONTROL OF A SYSTEM

RELATED APPLICATIONS

This application claims the benefit of U.S. application Ser. No. 60/113,425 filed Dec. 22, 1998 and U.S. application Ser. No. 60/131,723 filed Apr. 30, 1999.

TECHNICAL FIELD OF THE INVENTION

This invention relates generally to system control and more particularly to a system and method for self-tuning feedback control of a system.

BACKGROUND OF THE INVENTION

Modern systems perform precision operations and must be robust against various disruptions such as noise and disturbances. To combat these disruptions, run-to-run control methods attempt to compensate for system errors. These run-to-run control methods often rely on techniques to model noise and disturbances affecting the system. Run-to-run control methods are often "learning," in that error corrections are based on past process mistakes. These learning methods may suffer instability or poor performance while detecting and compensating for errors.

Wafer fabrication is a process particularly suited to run-to-run control, since wafer fabrication requires precise alignment between a photomask and a wafer. Alignments during fabrication are susceptible to many errors, such as variations in the optical path of an alignment sensor due to thermal effects or overlay shifts caused by maintenance and parts renewal. To combat process errors, photolithography steppers typically allow an operator to specify offset corrections. These offsets adjust the target location on the wafer to compensate for process errors. However, controlling these systems is a time consuming and expensive process, and problems in run-to-run control systems can introduce instability and result in producing defective devices. Thus there is a need for effective run-to-run control without sacrificing system stability.

SUMMARY OF THE INVENTION

In accordance with the present invention, a system and method for self-tuning feedback control of a system is provided which substantially eliminates or reduces disadvantages and problems associated with previous systems and methods. According to one embodiment of the invention, a method for controlling a system determines a nominal gain of the system, a maximum gain of the system, and a sequence of error measurements of the system. Based on the nominal gain, the maximum gain, and the sequence of error measurements, the method determines a stable sequence of tuning gains. The method tunes the system using the stable sequence of tuning gains.

In accordance with another embodiment of the present invention, a self-tuning photolithography system includes a stepper that aligns a target of a photolithography overlay based on an alignment command. The system further includes a sensor that generates an alignment measurement and a metrology device that detects an error of the stepper. This error comprises a high frequency component induced by an unknown noise and a low frequency component induced by an unknown disturbance. The system also includes a tuner that determines a stable tuning gain based upon the error, a nominal gain for the stepper, and a maximum gain for the stepper. In addition, the system includes a feedback controller that determines a feedback offset based upon the error and the stable tuning gain. The system further includes a stepper alignment controller that generates the alignment command based upon the alignment measurement and the feedback offset.

The invention provides a number of technical advantages. The present invention controls a response to a disturbance without a priori knowledge of the disturbance or noise affecting the system. This provides control without the need for modeling the perturbations affecting the system. In addition, the present invention self-tunes to maintain system stability while responding to disturbances masked by noise. Thus the system combats process errors without disrupting the process and without frequent maintenance of a control device. The invention also filters higher frequencies, ensuring that controlled processes are robust in the presence of noise, including metrology noise.

Incorporating the present invention into a photolithography process also provides technical advantages. The invention controls the photolithography process using a stable sequence of tuning gains that filter out responses to noise and reduce errors introduced by feedback control. This automated control reduces maintenance overhead and the number of rejected devices produced, and thus increases efficiency and decreases production costs. In a wafer fabrication plant, each run is worth thousands of dollars. Therefore, the present invention's stability provides critical control without introducing costly errors.

Other technical advantages of the present invention will be readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
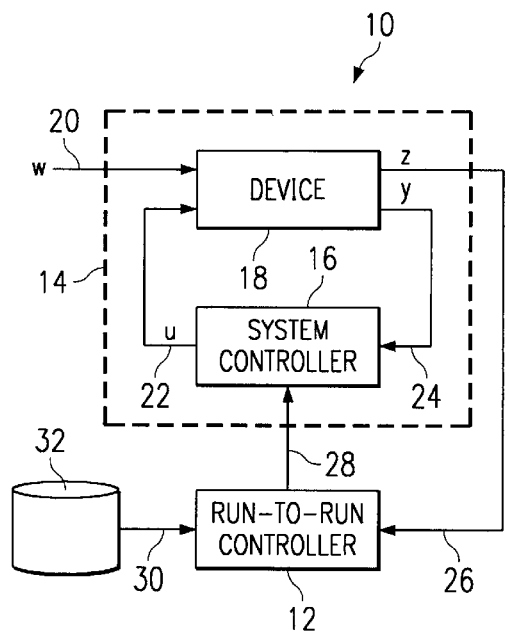
FIG. 1 is a block diagram illustrating a run-to-run controlled system.

FIG. 1 illustrates a run-to-run controlled system that includes a run-to-run controller 12 coupled to a controlled system 14. Controlled system 14 encompasses both a system controller 16 and a device 18 operable to perform a process. Device 18 may be any type of controlled device that has an error measurement. In a particular embodiment, device 18 is a photolithography stepper.

In operation, device 18 performs a process while being subjected to a perturbation 20. Perturbation 20 represents any disturbance that can disrupt the process, and typically includes a noise component and a disturbance component. In certain cases, the noise and disturbance components of perturbation 20 can be modeled respectively as high and low frequency components.

Run-to-run controlled system 10 contains two control loops to control the process and respond to perturbation 20. The first control loop between system controller 16 and device 18 controls the process being carried out by device 18, while the second control loop between run-to-run controller 12 and controlled system 14 allows for corrections based on the results of the process.

Device 18 performs the process based on a process command 22 and generates a process measurement 24 and a process error 26. Process command 22 may be any type of command for controlling the process such as alignment commands, target coordinates, or offset commands. Process measurement 24 may be any measurement for use in controlling the process, for example, a measurement of current device positioning. Process error 26 is any metric describing the results of the process, for example, a measurement of misalignment between a target location and an actual location on a wafer. Process error 26 can include multiple components, such as noise, disturbance, high frequency, or low frequency components. System controller 16 generates process command 22 based on process measurement 24 and a feedback command 28. Run-to-run controller 12 generates feedback command 28 based on process error 26 and system parameters 30 stored in a storage device 32.

Figure 2:
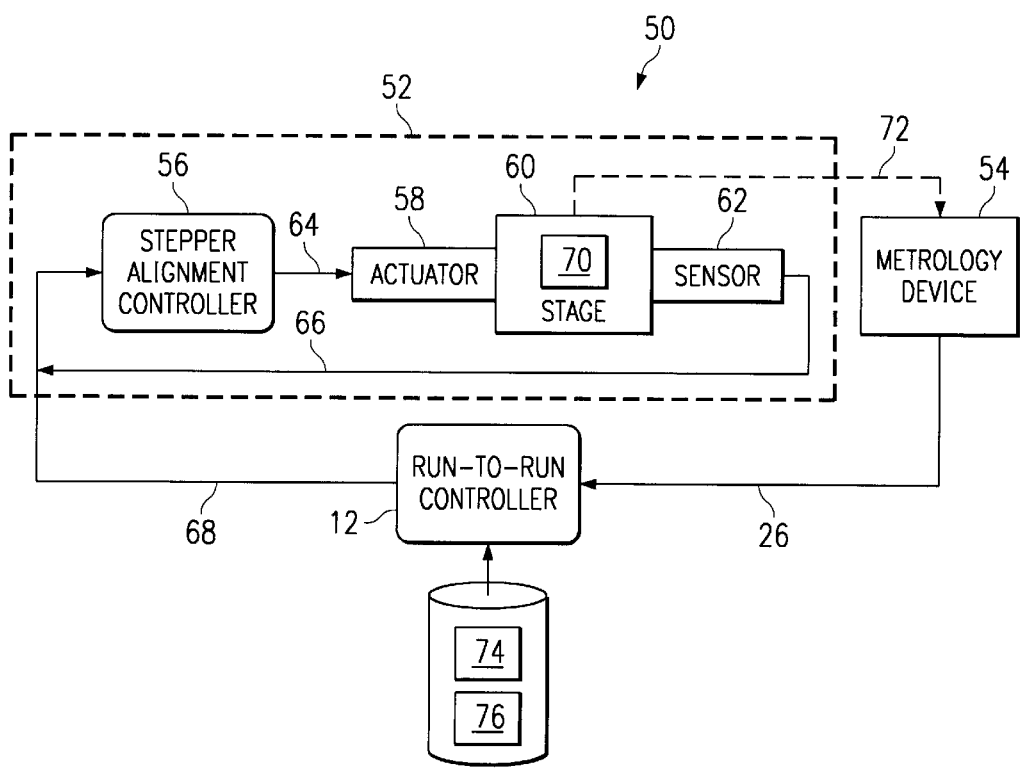
FIG. 2 is a block diagram illustrating run-to-run feedback control of a photolithography stepper.

FIG. 2 shows a particular application of a run-to-run controlled system, a run-to-run controlled photolithography system 50. Run-to-run controlled photolithography system 50 includes run-to-run controller 12 coupled to a photolithography stepper 52 and a metrology device 54. Photolithography stepper 52 includes four major components: a stepper alignment controller 56, an actuator 58, a stage 60, and a sensor 62. Although the following discussion focuses on run-to-run controllers in a photolithography process, controller 12 may be adapted in a similar fashion to other control applications.

Stepper alignment controller 56 represents a functional block similar to system controller 16 from FIG. 1. Accordingly, stepper alignment controller 56 generates an alignment command 64 based on an alignment measurement 66 received from sensor 62 and a feedback offset 68 received from run-to-run controller 12.

Alignment command 64 from stepper alignment controller 56 enables actuator 58 to position a target 70 within stage 60. Sensor 62 detects the positioning of target 70 within stage 60 and generates alignment measurement 66. Thus the control loop that includes sensor 62, stepper alignment controller 56, actuator 58, and stage 60 positions target 70 within stage 60. Target 70 represents the subject of the photolithography process, for example, a wafer.

After target 70 has been properly positioned within stage 60, a photolithography process is performed on target 70. Metrology device 54 generates a process measurement 72. Based on process measurement 72, metrology device 54 generates process error 26, which in the photolithography example can include x-markshift, y-markshift, x-scaling, y-scaling, magnification, or any other indication of process error. The present invention contemplates a controlled system with run-to-run control loops for any number of process errors.

Run-to-run controller 12 then generates feedback offset 68 based on process error 26 received from metrology device 54 and system parameters 30 stored in storage device 32. System parameters 30 can include any information concerning the operation of photolithography stepper 52. In a particular example described later, system parameters include a nominal gain 74 and a maximum gain 76 of stepper 52. The control loop between run-to-run controller 12 and photolithography stepper 52 provides run-to-run control of the photolithography process based on the process error 26.

Figure 3:
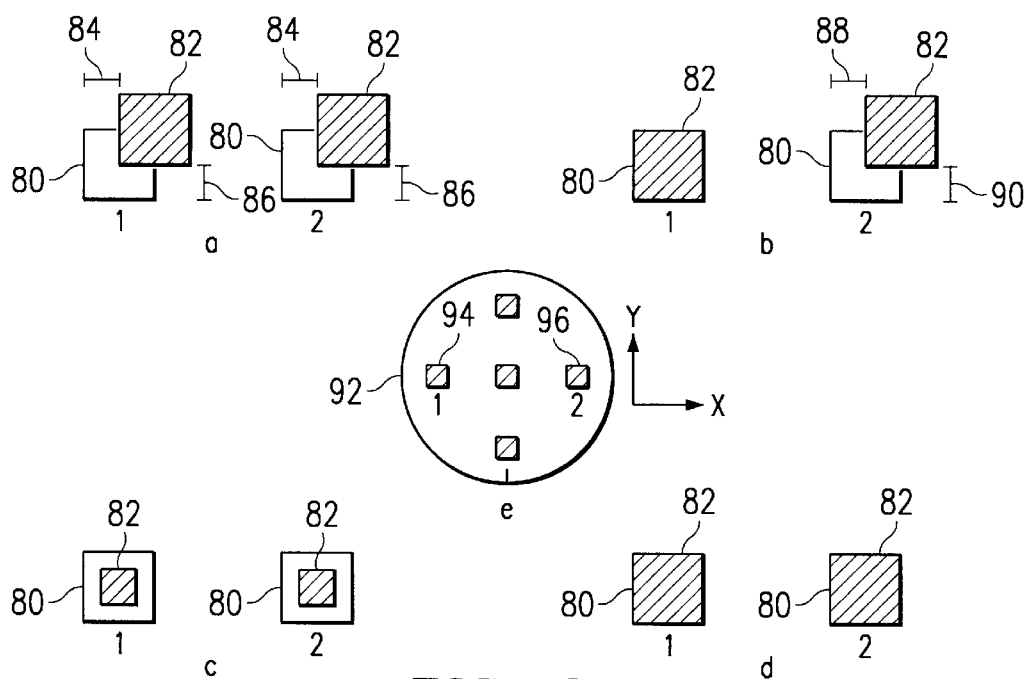
FIG. 3 illustrates different errors that can affect a photolithography process.

FIG. 3 illustrates alignment errors typical in a photolithography process. Wafer 92 illustrates how metrology device 54 measures misalignments between a target location 80 and an actual location 82. For example, metrology device 54 measures wafer 92 at a first location 94 and a second location 96. Measurements from these locations are then compared to the ideal results to determine process error 26. Example a illustrates a misalignment between target location 80 and actual location 82 resulting from an x-markshift 84 and a y-markshift 86. Example b illustrates a misalignment between target location 80 and actual location 82 resulting from an x-scaling 88 and a y-scaling 90. Example c illustrates a misalignment between target location 80 and actual location 82 resulting from a magnification error. Example d illustrates the ideal case with no misalignment between target location 80 and actual location 82.

Figure 4:
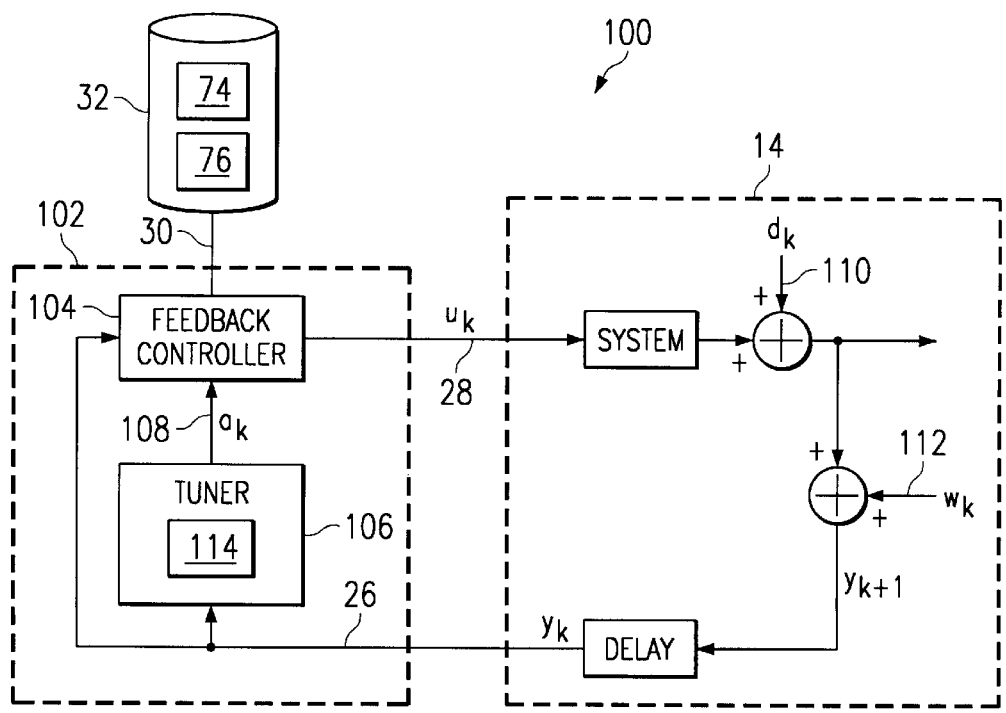
FIG. 4 is a block diagram illustrating a tuned run-to-run controlled system.

FIG. 4 illustrates a tuned run-to-run controlled system 100 that includes a tuned run-to-run controller 102 and controlled system 14. Tuned run-to-run controller 102 receives process error 26 and system parameters 30 and generates feedback command 28. Tuned run-to-run controller 102 contains two functional units: a feedback controller 104 coupled to a tuner 106.

To properly describe the operation of tuned run-to-run controller 102, a number of equations must be examined. For convenience, equations will be developed assuming process error 26 is a misalignment as shown by x-markshift 84 in example a of FIG. 3. System 100 contemplates similar control equations for other errors of interest. Also, although this assumes a photolithography process, controller 102 applies to any self-tuned feedback control system.

The design of tuned run-to-run controller 102 is split into two parts. The first details the operation of feedback controller 104, which incorporates discrete time control, a spike filter, and increased filtering at higher frequencies. The second details the operation of tuner 106, which regulates feedback controller 104. Tuner 106 balances the effects of disturbance and noise in generating a tuning gain 108, which tunes the response of feedback controller 104.

Feedback controller 104 receives process error 26 and tuning gain 108 and generates feedback command 28. For x-markshift, tuned run-to-run controlled system 100 can be nominally modeled as:

$$y_k = u_k + d_k + w_k, \; k=0,1,2,\ldots \quad (1)$$

where k is the run number, y is the misalignment in x-markshift (process error 26) measured by metrology device 54, u is feedback command 28, d represents a disturbance component 110 of perturbation 20, and w represents a noise component 112 of perturbation 20. It is typically assumed that $w_k$ is a sequence of independent random variables. In practice, $w_k$ shows short order correlation due to manufacturing techniques designed to minimize cycle time. This corresponds to weak device dependencies that are not modeled since doing so would substantially cut down the sampling rate and render feedback controller 104 ineffective. These weak device dependencies are dealt with by restricting the bandwidth of feedback controller 104 to filter through such short order correlation. This ties in naturally with the fact that although equation (1) shows a unity nominal stepper gain from input to output, in practice, the stepper gain could be non-unity. This also requires that the bandwidth of feedback controller 104 be restricted to guarantee stability by enforcing a sufficient gain margin.

Other issues that affect the design of feedback controller 104 include metrology delays. Given a metrology delay, stability is preferred over performance. Also, since there is no guaranteed maximal measurement delay (for example if metrology device 54 goes down and runs back up), the control loop should be stable for as large a delay as possible. In addition, maverick runs with an exceptional amount of misalignment should be discounted. For this, a spike filter 114 proves useful. Although spike filer 114 is shown within tuner 106, the equations developed below reflect that system 100 contemplates spike filter 114 affecting both tuner 106 and feedback controller 104. Also, feedback controller 104 must account for the fact that most of the noise energy is concentrated at higher frequencies. Hence, to be robust against this noise, higher frequencies must be filtered more heavily. All frequency domain representations assume that data is sampled with a virtual sampling period of one second.

In developing feedback controller 104, first consider the following (continuous time) controller represented in the Laplace domain by:

$$C(s) = \frac{k}{s(s+b)}. \tag{2}$$

This represents a continuous analog of the exponentially weighted moving average (EWMA) type controller augmented with a filtering term to provide additional noise immunity at higher frequencies. The relationship between k and b can be restricted as follows.

Consider process error 26 as represented by the function Y(s), feedback command 28 as represented by the function U(s), and the function of feedback controller 104 as C(s). Given equation (2), the characteristic equation of the closed loop is:

$$s^2 + bs - k = 0. \tag{3}$$

In order for the system to be critically damped, it is required that equation (3) have equal real solutions. Therefore, a critically damped solution results in:

$$b = 2a$$

$$k = a^2 \tag{4}$$

with $a \geq 0$ in order to ensure stability. This yields the following controller equation parameterized by a single variable $a \geq 0$:

$$C(s) = -\frac{a^2}{s(s+2a)}. \tag{5}$$

The next task is discretizing the controller in equation (5). When a run logs into controlled system 14, controlled system 14 samples feedback command 28 from feedback controller 104. After the run has processed, run-to-run controller 12 samples process error 26 and holds this until the next run logs through. Hence, the process can be modeled as a delay free conduit: sampling feedback controller 104, adding the disturbance and noise components of perturbation 20, and uploading the resulting data to a zero order hold (ZOH). Hence, a ZOH must be assumed in discretizing controller equation (5). This yields the following discrete time controller (in z transform form):

$$C(z) = -\frac{\left(\frac{a}{2}\right)}{z-1} + \frac{\left(\frac{1-e^{-2a}}{4}\right)}{z-e^{-2a}}. \tag{6}$$

This corresponds, in state space form to:

$$x_{k+1} = \begin{bmatrix} 1 & 0 \\ 0 & e^{-2a} \end{bmatrix} x_k + \begin{bmatrix} \frac{a}{2} \\ \frac{e^{-2a}-1}{4} \end{bmatrix} y_k \tag{7}$$

$$u_k = [-1 \quad -1] x_k, \quad k = 0, 1, 2, \ldots$$

where $X_k \in R^2$. This equation can be implemented with any suitable controlling hardware, software, or combination of hardware and software. In a particular embodiment it can be implemented via two tuners within ProcessWORKS.

Figure 5A:
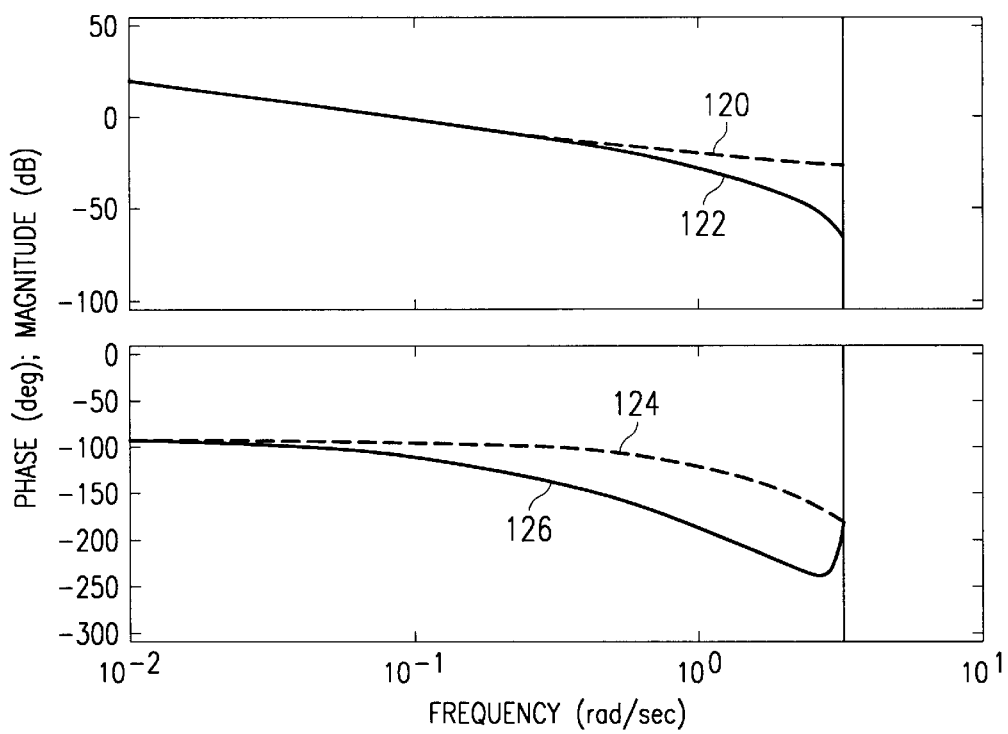
FIGS. 5A and 5B are graphs comparing responses for two exemplary controllers available for the present invention.
Figure 5B:
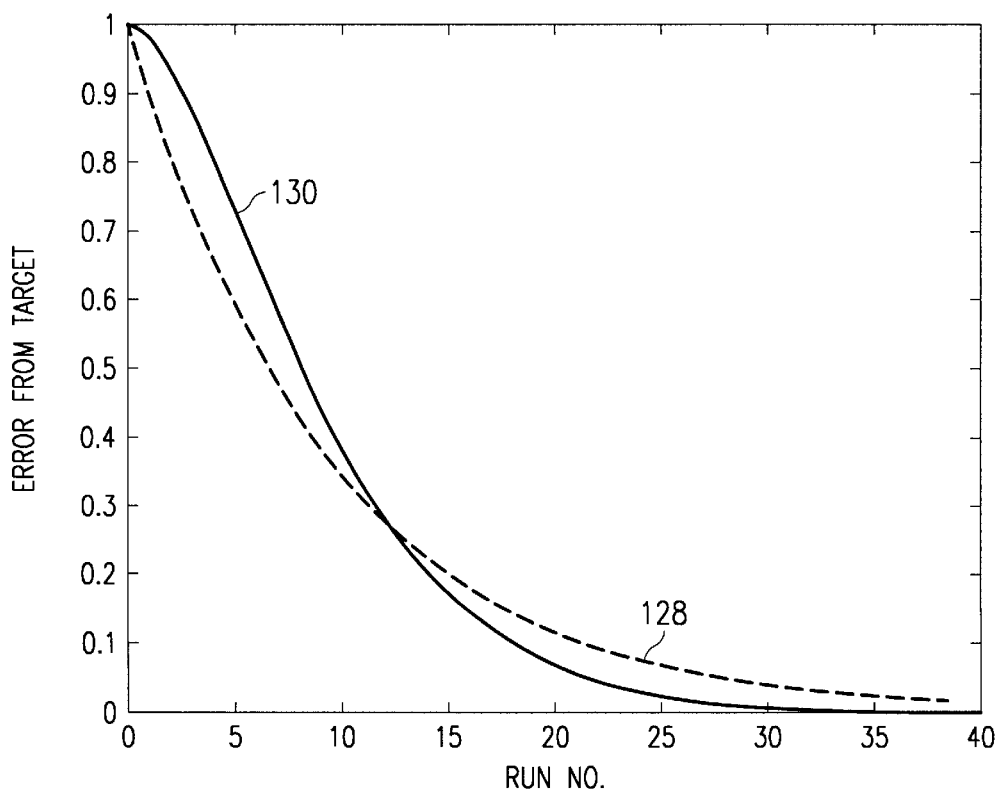

FIGS. 5A and 5B compare the control characteristics of equation (7) with a typical EWMA controller described by the integral controller equation:

$$P_{k+1} = P_k + \lambda y_k, \text{ with } u_k = -P_k. \tag{8}$$

The Bode plot in FIG. 5A illustrates the additional noise immunity that equation (7) achieves, comparing the frequency response of equation (7) given a=0.2 to an EWMA controller with λ=0.1. Trace 120 and trace 124 show the response of the EWMA controller, and trace 122 and trace 126 show the response of equation (7). Using equation (7) results in increased filtering of high frequencies as indicated by traces 122 and 126.

The second order nature of equation (7) also yields a faster transient response than the EWMA, as is apparent in FIG. 5B. Trace 130 shows the sharper response of equation (7) to a unit step disturbance in comparison with trace 128, which shows the response of the EWMA controller. Although certain control techniques offer advantages depending on the controlled process, system 100 contemplates incorporating an EWMA, second order, or any suitable controller for feedback controller 104.

Referring again to FIG. 4, there is a period of time between when a run gets logged into controlled system 14 and when process error 26 for that run becomes available. Thus, multiple runs can log through controlled system 14 before process error 26 from the first run becomes available. This results in phase lag and could lead to deterioration in feedback controller 104 performance and possible instability. One technique to prevent loss of stability is to move the delay outside the control loop. This is accomplished by predicting what the current measurement would have been if the latest values of the states $X_k$ are used. Let $\tau+1 \geq 1$ denote the number of runs that have been logged into the controlled system 14 that are not yet measured. This yields the following state evolution equation:

$$x_{k+1} = \begin{bmatrix} 1 & 0 \\ 0 & e^{-2a} \end{bmatrix} x_k + \begin{bmatrix} \frac{a}{2} \\ \frac{e^{-2a}-1}{4} \end{bmatrix} (y_{k-\tau} - [1 \ 1]x_k - u_{k-\tau}) \quad (9)$$

$$= \begin{bmatrix} 1-\frac{a}{2} & -\frac{a}{2} \\ \frac{1-e^{-2a}}{4} & \frac{1-3e^{-2a}}{4} \end{bmatrix} x_k + \begin{bmatrix} \frac{a}{2} \\ \frac{e^{-2a}-1}{4} \end{bmatrix} (y_{k-\tau} - u_{k-\tau}).$$

For many applications, controlled system 14 can only accept feedback command 28 up to a finite precision. Let $\eta$ denote the difference between two acceptable values for feedback command 28. This requires a minor modification to the equation for $u_k$ in equation (7). In addition, Spike filter 114 will be incorporated into the equation. Spike filter 114 works by comparing the current measurement to the previous one. If the magnitude of their difference is greater than $\Delta>0$, no tuning takes place. This operation can be described (assuming no measurement delay) as:

$$\begin{cases} \text{Tune} & \text{if}|y_k - y_{k-1}| \leq \Delta \\ \text{Don't Tune} & \text{if}|y_k - y_{k-1}| > \Delta. \end{cases} \quad (10)$$

Adding the spike filter and the control input resolution to equations (7) and (9) results in the following controller equations:

$$x_{k+1} = x_k + \left( \begin{bmatrix} -\frac{a}{2} & -\frac{a}{2} \\ \frac{1-e^{-2a}}{4} & 3e^{-2a} - \frac{1}{4} \end{bmatrix} x_k + \begin{bmatrix} \frac{a}{2} \\ \frac{e^{-2a}-1}{4} \end{bmatrix} (y_{k-\tau} - u_{k-\tau}) \right) \cdot \quad (11)$$

$$\text{round}\left(\frac{\Delta}{\Delta + \text{abs}(y_{k-\tau} - \tilde{x}_k)}\right),$$

$$\tilde{x}_{k+1} = y_{k+\tau}$$

$$u_k = \eta \cdot \text{round}\left(\frac{1}{\eta}[-1 \ -1]x_k\right),$$

which implies that the controller states are now $[X_k \ \tilde{X}_k]^T \in R^3$. Therefore, equation set (11) describes a particular embodiment for feedback controller 104. These equations, however, require some method for determining parameter a.

Tuner 106 provides tuning gain 108 designed to operate as parameter a in equation set (11). Thus we now turn to the design of tuner 106 in tuned run-to-run controller 102.

Figure 6A:
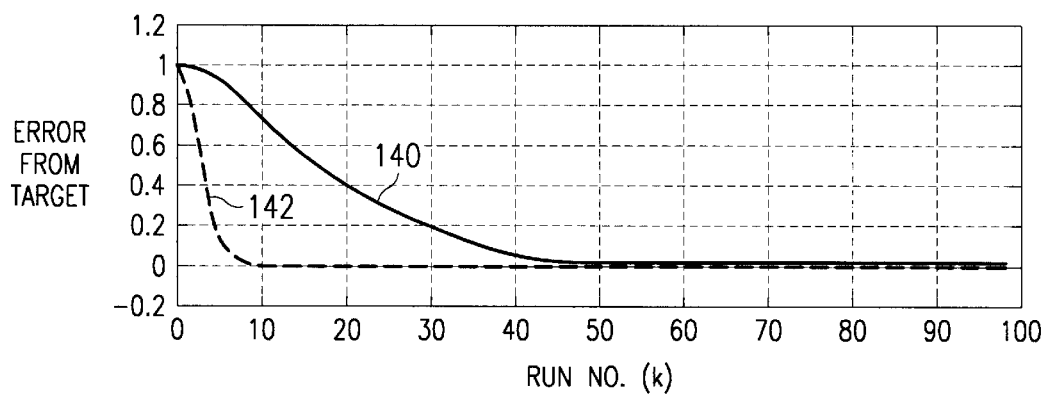
FIGS. 6A and 6B are graphs comparing response of an exemplary controller to disturbance and error given two different tuning gains.
Figure 6B:
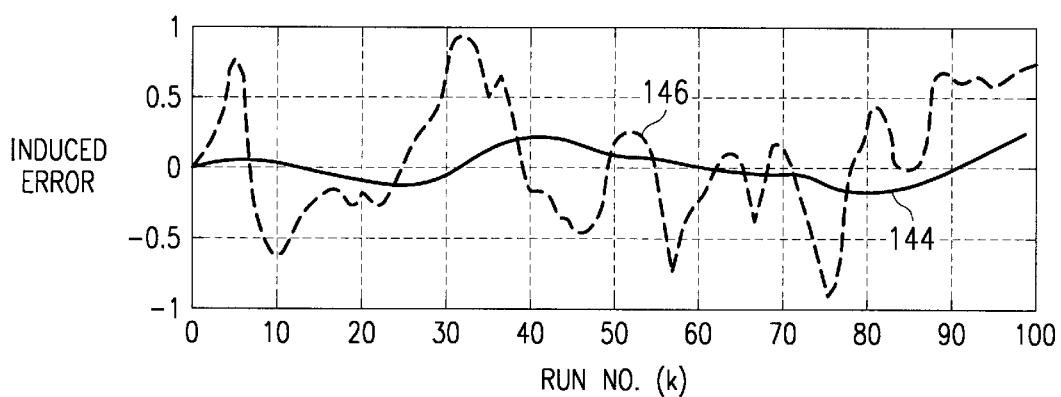

FIGS. 6A and 6B illustrate the dependence of the closed-loop response of feedback controller 104 given values of 0.1 and 0.6 for tuning gain 108. Trace 140 and trace 144 track the response of feedback controller 104 for tuning gain 108 equal to 0.1, and trace 142 and trace 146 track the response for tuning gain 108 equal to 0.6. FIG. 6A shows the transient response when there is a unit step disturbance and no noise. Trace 142 shows that a larger value of tuning gain 108 yields a faster response than for trace 140, allowing feedback controller 104 to reject the disturbance quickly. Thus for this case, a larger value of tuning gain 108 is preferable. FIG. 6B shows the response of feedback controller 104 when there is no disturbance, but there is a zero mean Gaussian noise with a standard deviation of one. Thus FIG. 6B illustrates error induced by the feedback loop given values of 0.1 and 0.6 for tuning gain 108. Trace 146 shows that a high value for tuning gain 108 causes feedback controller 104 to react to noise while a lower value for tuning gain 108 yields a reduced response to noise as shown in trace 144.

Typically, perturbation 20 contains a mix of both noise and disturbance, and the preferred value of tuning gain 108 is determined by the nature of this mix. Following a step disturbance, a larger value for tuning gain 108 is desirable. Once feedback controller 104 rejects the disturbance, the value of tuning gain 108 should be reduced to decrease sensitivity to noise.

In order to take appropriate corrective action, tuner 106 considers both the average regulation error in the output and the amount of noise. The estimators for the mean error and mean square error, respectively, are $$\mu_{k+1}(1-\epsilon)\mu_k + \epsilon(y_{k-\tau}-[1 \ 1]X_k-u_{k-\tau})$$

$$\zeta_{k+1} = (1-\epsilon)\zeta_k + \epsilon(y_{k-\tau}-[1 \ 1]X_k-u_{k-\tau})^2 \quad (12)$$

where $\mu_0^2 = \zeta_0 > 0$. Also $0 < \epsilon < 1$ (with $\epsilon \sim 0$ preferably). Equations (12) illustrate only a particular embodiment, and system 100 contemplates any suitable filter process for determining these components. In a particular embodiment, these equations are designed to represent a high frequency component and a low frequency component of process error 26. Equations (12) shown above are structured with non-zero measurement delays ($\tau$), and, given the initialization constraint, $\mu_k^2 \leq \zeta_k$ for all k. To ensure numerical stability and that the maximal value of parameter a (tuning gain 108) is bounded by some maximal value $\theta > 0$ determined via gain margin considerations, the time-varying parameter $a_k$ may be expressed as:

$$a_k = \theta \frac{\delta^2 + 2((1-\varepsilon)\mu_k + \varepsilon(y_{k-\tau}-[1 \ 1]x_k - u_{k-\tau}))^2}{\delta + ((1-\varepsilon)\mu_k + \varepsilon(y_{k-\tau}-[1 \ 1]x_k - u_{k-\tau}))^2 +} \quad (13)$$
$$(1-\varepsilon)\zeta_k + \varepsilon(y_{k-\tau}-[1 \ 1]x_k - u_{k-\tau})^2$$

where $1 > \delta > 0$, with $\delta \sim 0$ (e.g. $\delta = 10^{-6}$) chosen to ensure good numerical behavior. Equation (13) ensures that $0 < a_k < \theta$ and hence $a_k$ is bounded and positive.

This equation produces predictable behavior. If the process is subject to large amounts of noise, then $\zeta_k$ grows and $a_k$ becomes small, preventing feedback controller 104 from responding to noise. If the process is stationary, then feedback controller 104 will center around zero and $\mu_k$ will become small, effectively switching off feedback controller 104. In the presence of a shift or a drift, $\mu_k$ will grow and tuner 106 will become more aggressive. However, the growth in $a_k$ is tempered by the amount of process noise reflected by $\zeta_k$.

A limitation of equation (13) becomes apparent when considering a controlled system where the estimated system gain differs from the true system gain. In this case, the tuning gain calculated will be sub-optimal. This causes the system to attack disturbances less aggressively and thus increases the mean square error. Also, error in estimating system gain can result in instability. To prevent this instability, a function must cap the effect of noise or the high frequency component in certain circumstances.

In order to minimize the performance penalty for incorrect estimates of system gain, equation (13) can be supplemented with a function designed to bias the point where optimality is achieved. First, a term is introduced into equation (13) to selectively weight the mean square error and the square of the mean error terms such that the denominator of equation (13) becomes:

$$\delta+(1+\gamma_k)((1-\epsilon)\mu_k+\epsilon(y_{k-\tau}-[1\ 1]X_k-u_{k-\tau}))^2+$$
$$(1-\gamma_k)(1-\epsilon)\zeta_k+\epsilon(y_{k-\tau}-[1\ 1]X_k-u_{k-\tau})^2 \quad (14)$$

The term $\gamma_k$ is developed by the equation $$\gamma_{k+1} = Proj\left(\gamma_k + \beta\left(\frac{4\mu_k^2}{\xi_k a_k}\left(\frac{\overline{\theta}}{\theta^*}-1\right)+\left(\frac{\mu_k^2}{\xi_k}-1\right)\gamma_k\right)\right), \text{ where} \quad (15)$$

$$Proj(x) = \begin{cases} 1, & \text{if } x \geq 1 \\ 0, & \text{if } x \leq 0 \\ x, & \text{otherwise} \end{cases}$$

In equation (15), $\overline{\theta}$ is maximum gain 76, $\theta^*$ is nominal gain 74, and $0<\beta\leq\epsilon$.

Figure 7A:
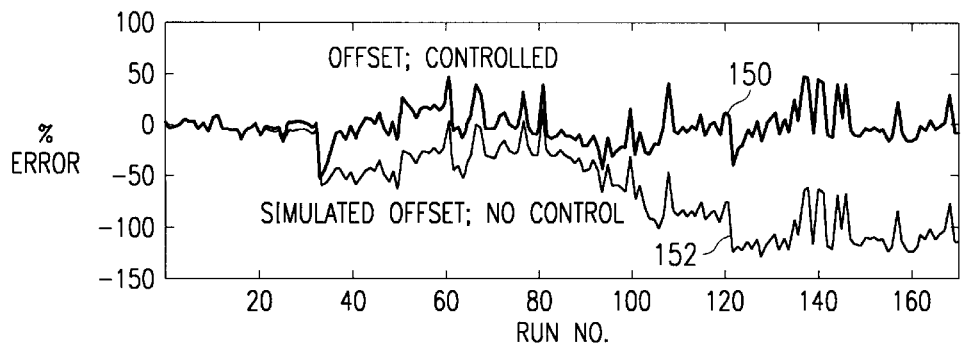
FIGS. 7A and 7B are graphs displaying error measurements of a production process controlled according to the teachings of the present invention and example behavior of an exemplary controller in response to these error measurements.
Figure 7B:
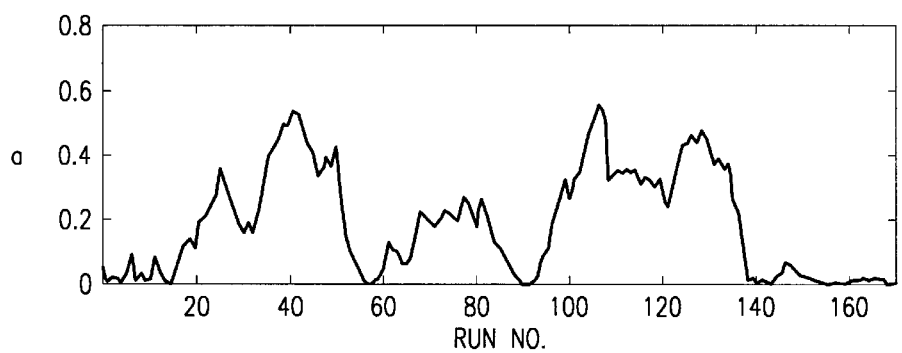

FIGS. 7A and 7B illustrate the effectiveness of tuned run-to-run controller 102 in controlling an actual production process. FIG. 7A shows process error 26 for a system affected by perturbations 20. Trace 150 tracks the actual error for the system controlled by tuned run-to-run controller 102, while trace 152 tracks simulated process error 26 for the same system operating without tuned run-to-run controller 102. Trace 150 demonstrates the effectiveness of tuned run-to-run controller 102 in canceling out perturbations 20 that steadily cause trace 152 to contain more error.

FIG. 7B displays the value for tuning gain 108 generated by tuner 106 corresponding to the runs charted in FIG. 7A. Tuner 106 increases and decreases tuning gain 108 in response to errors of the controlled system. Thus tuned run-to-run controller 102 responds quickly during process shifts and then decreases sensitivity to errors during periods with little or no process shift.

Figure 8:
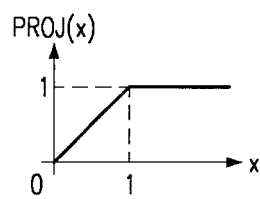
FIG. 8 is a graph displaying a function for selectively weighting high and low frequency components of an error measurement in the controller.

FIG. 8 is a graph showing simplified results of function (15) for selectively weighting disturbance and noise components of perturbation 20. In a particular embodiment, equation (15) selectively weights a low frequency and high frequency component of process error 26. FIG. 8 illustrates the non-linear weighting function in which there is a sloped region where noise and disturbance are each given weight and a flat region where noise or high frequency components are disregarded. Between zero and one on the x-axis, a first mode of operation is shown in which noise and disturbance each contribute in calculating tuning gain 108. From one on, a second mode of operation disregards noise in calculating tuning gain 108. This second mode of operation ensures that, by restricting the value of the gain, tuned run-to-run controller 102 will not become unstable.

Figure 9:
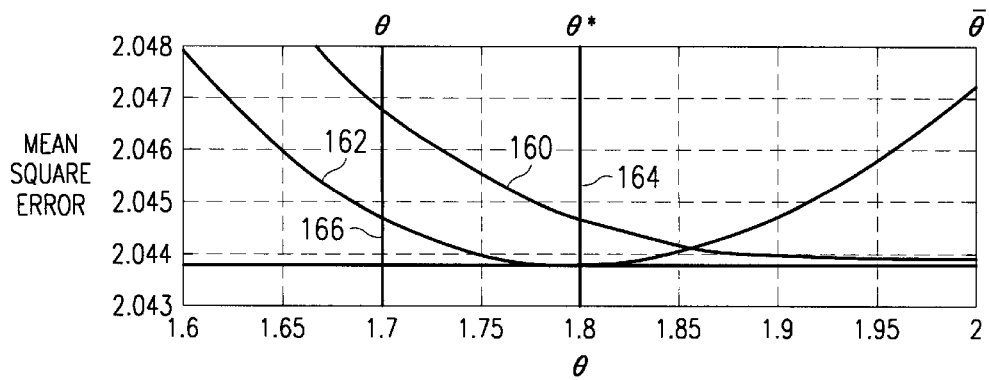
FIG. 9 is a graph illustrating the effect of biasing an exemplary controller to a nominal gain.

FIG. 9 is a graph comparing the mean square error for a system biased to a nominal gain versus an unbiased system. Trace 160 tracks the mean square error for an unbiased system and demonstrates the intolerance of such a system to variances between estimated gain and actual gain. Trace 162 tracks an example mean square error for a system biased to a nominal gain. Trace 162 demonstrates the tolerance of the invention even in light of the difference between x point 164 at the nominal gain for the example and x point 166 at the actual gain for the example. Comparing trace 160 and trace 162 illustrates the benefit of biasing tuner 106 with nominal gain 74. This centers the response of the system around the best guess, nominal gain 74, and reduces the performance penalty for incorrectly estimating system gain. For example, at the x point 166 indicating actual system gain, trace 162 shows a much smaller deviation from optimal mean square error than trace 160.

Although the equations developed focus on a single input single output (SISO) control system, the present invention contemplates additional techniques and equations for handling single input multiple output (SIMO), multiple input single output (MISO), and multiple input multiple output (MIMO) control systems. The equations above were developed to generate a feedback offset given the input of x-markshift. For these equations, nominal gain and maximum gain are point values. For a MISO control system, for example, nominal and maximum gain may be described by an elliptical region and the following equations would hold:

$$y_{k+1}=\theta^T u_k+d_k+w_k, \text{ with } \theta\in\{\theta:(\theta-\overline{\theta})^T\Gamma(\theta-\overline{\theta})\leq 1\}$$
$$u_{k+1}=u_k-ca_k y_{k+1}$$

$$c = \frac{\Gamma\overline{\theta}}{\overline{\theta}^T\Gamma\overline{\theta}+\sqrt{\overline{\theta}^T\Gamma\overline{\theta}}} \quad (16)$$

$$\gamma_{k+1} = Proj\left(\gamma_k + \beta\left(\frac{4\mu_k^2}{\xi_k \lambda_k}\left(\frac{1}{c^T\overline{\theta}}-1\right)+\left(\frac{\mu_k^2}{\xi_k}-1\right)\gamma_k\right)\right),$$

where $a_k$ is calculated as previously described.

Figure 10:
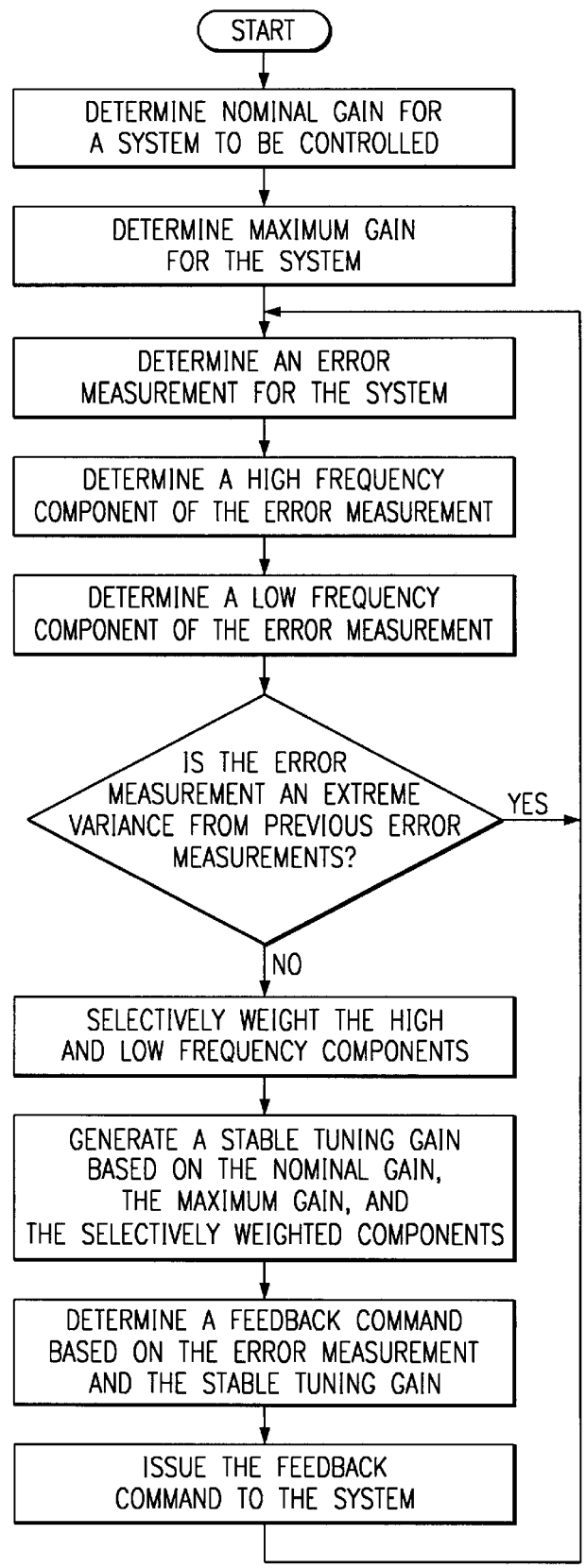
FIG. 10 is a flowchart of a method for self-tuning feedback control of a system.

FIG. 10 is a flowchart diagramming a method for self-tuning feedback control of a system. At steps 200 and 202, tuned run-to-run controller 102 determines, respectively, a nominal gain and a maximum gain for a system to be controlled. At step 204, controller 102 determines an error measurement of the system. Controller 102 determines a high frequency and low frequency component of the error measurement, respectively, in steps 206 and 208. It is contemplated that these components may also be mean square error and mean of squared error or any terms differentiating between high and low frequency components or noise and disturbance affecting the system. Decision block 210 determines whether the error measurement is an extreme variation from previous error measurements. If so, controller 102 receives the next error measurement at step 204, or alternatively, controller 102 clips the extreme value and continues to step 212.

After filtering out extreme variances in step 210, controller 102 selectively weights the high and low frequency components of the error measurement at step 212. This selective weighting may also include a first mode of operation giving weight to both the high and low frequency components, and a second mode of operation that disregards the high frequency component. At step 214, controller 102 generates a stable tuning gain based on the nominal gain, the maximum gain, and the selectively weighted components. Controller 102 determines a feedback command based on the error measurement and the stable tuning gain at step 216. At step 218, controller 102 issues the command to the system.

Although the present invention has been described in several embodiments, a myriad of changes and modifications may be suggested to one skilled in the art, and it is intended that the present invention encompass such changes and modifications as fall within the scope of the appended claims.

What is claimed is:

1. A method for controlling a system, comprising the steps of:

providing a system to be controlled;

determining and storing a set of system parameters;

determining a sequence of error measurements from said system;

determining a stable sequence of tuning gains based upon the sequence of error measurements and the stored system parameters;

determining a feedback offset for said system using the stable sequence of tuning gains; and providing a system controller for controlling said system responsive to a process measurement from said system and said feedback offset.

2. The method of claim 1 further including the step of generating a control signal responsive to said feedback offset.

3. A method for controlling a system, comprising:

determining a nominal gain of a system;

determining a maximum gain of a system;

determining a sequence of error measurements of the system;

determining a stable sequence of tuning gains based upon the sequence of error measurements, the nominal gain, and the maximum gain; and tuning the system using the stable sequence of tuning gains;

wherein the stable sequence of tuning gains comprises:
 a first stable sequence of tuning gains in a first mode of operation to increase responsiveness to error induced by an unknown disturbance; and
 a second stable sequence of tuning gains in a second mode of operation to decrease sensitivity to error induced by an unknown noise.

4. The method of claim 3, wherein each selected error measurement from the sequence of error measurements comprises an error induced by an unknown noise and an error induced by an unknown disturbance.

5. The method of claim 3, further comprising:

in a first mode of operation, determining a stable sequence of tuning gains by selectively weighting a high frequency component of the sequence of error measurements and a low frequency component of the sequence of error measurements; and in a second mode of operation, determining a stable sequence of tuning gains by disregarding the high frequency component of the sequence of error measurements.

6. The method of claim 5, wherein:

the high frequency component comprises a mean square error term; and the low frequency component comprises a square of the mean error term.

7. The method of claim 6, wherein the stable sequence of tuning gains biases the mean square error to be minimal at the nominal gain.

8. The method of claim 3, wherein the mean square error of the sequence of error measurements increases asymptotically as a function of the difference between the nominal gain and an actual gain of the system.

9. The method of claim 3, wherein the stable sequence of tuning gains controls a rate of response of the system to the sequence of error measurements.

10. The method of claim 3, wherein:

the stable sequence of tuning gains is driven toward an optimal tuning gain; and the optimal tuning gain provides an optimal tradeoff between maximizing the responsiveness to a low frequency component of the sequence of error measurements and minimizing the sensitivity to a high frequency component of the sequence of error measurements.

11. A method for controlling a system, comprising:

determining a nominal gain of a system;

determining a maximum gain of a system;

determining a sequence of error measurements of the system;

determining a stable sequence of tuning gains based upon the sequence of error measurements, the nominal gain, and the maximum gain; and tuning the system using the stable sequence of tuning gains;

further comprising the step of filtering a first error message from the sequence of error measurements based on a comparison between the first error measurement and a previous error measurement from the sequence of error measurements.

12. A self-tuning system, comprising:

a system controller for generating a measurement from a process and controlling said process based on a command;

a metrology device for measuring a result of said process and generating an error signal based on the result measured by said metrology device;

a tuner responsive to said error signal for determining a stable tuning gain based upon the error, a nominal gain for the process, and a maximum gain for the process; and a feedback controller for determining a feedback target based upon the error signal and said stable tuning gain for generating the command responsive to the measurement and the determined feedback target.

13. A self-tuning system, comprising:

a system controller for generating a measurement and performing a process based on a command;

means to generate an unknown noise and an unknown disturbance;

a metrology device for measuring a result of the process and generating an error signal based on the result measured by the metrology device, said error signal induced by said unknown noise and by said unknown disturbance;

a tuner responsive to said error signal for determining a stable tuning gain based upon the error signal, a nominal gain for the process, and a maximum gain for the process; and a feedback controller for determining a feedback target based upon the error signal and the stable tuning gain for generating the command based on the measurement and the feedback target, wherein the error signal comprises an error induced by said unknown noise and said error induced by an unknown disturbance.

14. The self-tuning system of claim 13, wherein the stable tuning gain controls a rate of response of the feedback controller.

15. The self-tuning system of claim 13, wherein the stable tuning gain prevents a resulting gain of the process from exceeding the maximum gain.

16. The self-tuning system of claim 13, wherein the tuner is further operable:

in a first mode of operation, to determine a stable tuning gain by selectively weighting a high frequency component of the error and a low frequency component of the error; and in a second mode of operation, to determine a stable tuning gain by disregarding the high frequency component of the error.

17. The self-tuning system of claim 13, wherein the tuner is further operable to increase the stable tuning gain in response to an increase of the low frequency component of the error.

18. A self-tuning photolithography system, comprising:
- a stepper for aligning a target of a photolithography overlay based on an alignment command;
- a sensor for generating an alignment measurement signal;
- means to generate unknown noise and unknown disturbance signals;
- a metrology device to detect an error of the stepper and provide an error signal which comprises a high frequency component induced by said unknown noise and a low frequency component induced by said unknown disturbance;
- a tuner responsive to said error signal to determine a stable tuning gain based upon the error, a nominal gain for the stepper, and a maximum gain for the stepper;
- a feedback controller to determine a feedback offset responsive to the error signal and the stable tuning gain; and
- a stepper alignment controller responsive to said feedback offset and said measurement signal for generating the alignment command.

19. The photolithography system of claim 18, wherein the tuner is further operable:
- in a first mode of operation, to determine a stable tuning gain by selectively weighting the high frequency component and the low frequency component; and
- in a second mode of operation, to determine a stable tuning gain by disregarding the high frequency component.

20. The photolithography system of claim 18, wherein the stable tuning gain controls a rate of response of the feedback controller.

* * * * *